(12) United States Patent
Boisseau

(10) Patent No.: US 7,114,600 B2  
(45) Date of Patent: Oct. 3, 2006

(54) DISC BRAKE COMPRISING AT LEAST ONE INCLINABLE BRAKE PAD

(75) Inventor: Jean-Pierre Boisseau, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/511,375

(22) PCT Filed: Apr. 14, 2003

(86) PCT No.: PCT/FR03/01186

§ 371 (c)(1),  
(2), (4) Date: Oct. 14, 2004

(87) PCT Pub. No.: WO03/087617

PCT Pub. Date: Oct. 23, 2003

(65) Prior Publication Data

US 2005/0126864 A1    Jun. 16, 2005

(30) Foreign Application Priority Data

Apr. 18, 2002    (FR) .................................. 02 04895

(51) Int. Cl.  
*F16D 55/08*    (2006.01)

(52) U.S. Cl. ..................... 188/72.7; 188/72.2

(58) Field of Classification Search ............... 188/72.2, 188/72.6, 72.7, 72.8, 73.41, 156, 157, 162  
See application file for complete search history.

(56) References Cited

U.S. PATENT DOCUMENTS

| | | | | |
|---|---|---|---|---|
| 3,662,864 A | * | 5/1972 | Evans | 188/72.2 |
| 3,809,190 A | * | 5/1974 | Evans | 188/72.2 |
| 3,850,268 A | * | 11/1974 | Guettier | 188/72.2 |
| 4,375,250 A | * | 3/1983 | Burgdorf | 188/72.2 |
| 4,602,702 A | * | 7/1986 | Ohta et al. | 188/72.1 |
| 4,852,699 A | * | 8/1989 | Karnopp et al. | 188/72.2 |
| 5,573,314 A | | 11/1996 | Akita et al. | |
| 5,775,782 A | * | 7/1998 | Akita et al. | 303/10 |
| 6,305,506 B1 | | 10/2001 | Shirai et al. | |
| 6,305,508 B1 | * | 10/2001 | Schumann | 188/72.8 |
| 6,318,513 B1 | * | 11/2001 | Dietrich et al. | 188/72.7 |
| 6,340,077 B1 | * | 1/2002 | Schaffer | 188/156 |
| 6,932,198 B1 | * | 8/2005 | Trinh | 188/72.7 |

FOREIGN PATENT DOCUMENTS

DE        10046177        4/2002

* cited by examiner

*Primary Examiner*—James McClellan  
*Assistant Examiner*—Mariano Sy  
(74) *Attorney, Agent, or Firm*—Leo H McCormick, Jr.; Sarah Taylor (57) ABSTRACT

A brake device for a motor vehicle having a friction first element with a first face that is pressed against a first face of a second element secured to a wheel of the motor vehicle during a brake application and an third element for applying a braking force bearing via a first end against a second face of the friction first element that is opposite from the first face of the friction first element. The brake device including an amplifier arrangement with a first part separated from a second part by a mutual and a tiltable plane containing a bearing surface located between the friction first element and the application third element relative to a plane for the first face of the second element. The amplifier arrangement rotating applied during a brake application to modify the pressing of the first face against the second face on the friction first element.

11 Claims, 8 Drawing Sheets

DISC BRAKE COMPRISING AT LEAST ONE INCLINABLE BRAKE PAD

The present invention relates mainly to a brake device for a motor vehicle, and to a brake system including such a device.

BACKGROUND OF THE INVENTION

A known type of brake device for a motor vehicle has a friction element or "brake pad" suitable or being pressed under the action of a piston against a brake disk that is constrained to rotate with a wheel of the vehicle.

The piston is in contact with a rear face of the brake pad in a plane that is substantially parallel to the plane of the brake disk.

The piston is moved towards the brake disk, e.g. by means of a hydraulic fluid under pressure or by means of an electric motor.

Document WO 98/14715 describes an electrical disk brake including an electric motor for moving a piston towards a brake pad and for pressing the brake pad against the brake disk when the brakes are applied. The bearing plane in which the piston bears against the brake pad forms a non-zero angle with the plane containing the brake disk along a radius of the brake disk, so that the bearing plane is tilted in the direction in which the brake disk rotates when the motor vehicle is traveling in the forward direction.

Thus, when the brakes are applied, while the brake pad is being pressed against the brake disk, the braking force delivered by the electric motor is amplified by a wedging effect to which the pad is subjected between the brake disk and the piston, thereby offering assistance to braking. The wedging effect is due to the torque exerted on the pad by the disk due to said disk rotating, with the pad then being clamped between the disk and the face of the piston that bears against the slanting face of the pad.

The wedging effect, which is well known the in the field of brakes, makes it possible to amplify very considerably the braking force applied to the piston. Unfortunately there is a risk of that phenomenon causing the wheel to block, which is detrimental to the stability of the vehicle. In addition, such amplification is not necessary for low levels of braking, and yet, in the example described in Document WO 98/14715, the amplification is present each time the brakes are applied.

OBJECTS AND SUMMARY OF THE INVENTION

An object of the present invention is therefore to offer a brake device that is effective and safe.

Another object of the present invention is to offer a brake device that makes it possible to obtain amplification that is controlled and variable, in particular continuously variable amplification, in the braking force delivered by applying the brakes.

Another object of the present invention is to offer a brake device that is suitable for being adapted to all existing brake systems without it being necessary to make any special modifications to them, and to make it possible to implement the functions of controlling the behavior of the vehicle by means of the brake system.

These objects are achieved by a brake device including a friction first element suitable for being pressed against a second element constrained to rotate with the wheel of the vehicle, the first element being pressed against the second element by means of a third element bearing against the first element, said device also including amplifier means for amplifying the braking force exerted by the third element against the first element by using the wedging effect, said amplifier providing an amplification ratio that is variable.

In other words the braking force amplifier operates by the brake pad being wedged in controlled and modifiable manner between the brake disk and the piston due to the torque to which the pad is subjected as it comes into contact with the rotating brake disk, the wedging being controlled by varying the angle of tilt of the bearing plane in which the piston bears against the pad relative to the plane containing the brake disk.

The term "amplification" is used to mean making use of the kinetic energy of the vehicle for braking purposes.

The present invention mainly provides a brake device for a motor vehicle, the brake device including a friction first element suitable for having a first face pressed against a first face of a second element which is secured to a wheel of the motor vehicle in order to slow said vehicle down, and an application third element for applying a braking force bearing via a first end against a second face of the friction first element that is opposite from the first face of the friction first element and suitable for pressing the friction first element against the second element, said brake device also including amplifier means for modifying the inclination of a tiltable plane containing the bearing surface between the friction first element and the application third element relative to a plane containing the first face of the second element.

The present invention also provides a brake device, wherein the means make it possible for the inclination of the plane containing the bearing surface between the friction first element and the application third element to be modified continuously relative to the plane containing the first face of the second element.

The present invention also provides a device, wherein the first means are constituted by a brake pad having a rigid support carrying the second face and a lining provided with the first face suitable for coming into contact with a first face of the brake disk, and wherein the third element includes a piston provided with the first face in contact with the second face of the rigid support via the amplifier means and a braking force generator suitable for applying a braking force to the piston.

The present invention also provides a device, wherein the braking force generator is a master cylinder.

The present invention also provides a device, wherein the braking force generator is an electric motor.

The present Invention also provides a device, wherein the braking force generator is a hydraulic pump.

The present invention also provides a device, wherein the means comprise a first part that is mounted to pivot in the piston, in the first end of said piston, and a second part mounted to pivot in the friction first element, in the second face of the friction first element, and wherein the first and second parts are in mutual abutment respectively via first and second plane faces, said faces being parallel to the tiltable plane.

The present invention also provides a device, wherein the first part is substantially in the shape of a half-cylinder disposed in a semi-cylindrical cavity integral with the piston and wherein the second part has substantially the shape of a half-cylinder disposed in a semi-cylindrical cavity in the friction first element.

The present invention also provides a device, wherein the first part is substantially in the shape of a half-sphere disposed in a hemispherical cavity integral with the piston, and wherein the second part is substantially in the shape of a half-sphere disposed in a hemispherical cavity integral with the friction first element.

The present invention also provides a device, wherein the means further comprise friction-reducing means for reducing the friction between respective ones of the first and second parts and respective ones of the first and second cavities, and also between the first and second faces of the first and second parts.

The present invention also provides a device, wherein the friction-reducing means are ball bearings.

The present invention also provides a device, wherein the amplifier means are activated by an electric motor.

The present invention also provides a device also including a parking brake mechanism co-operating with the braking force amplifier means so that the tiltable plane is tilted in the same direction as the gradient on which the motor vehicle is parked.

The present invention also provides a device including additional means for applying a braking force against the friction first element.

The present invention also provides a device, wherein the additional means are resilient means exerting a force on the piston so as to press the friction first element against the second element in the event that the generator fails.

The present invention also provides a device, wherein the means also make it possible to press the friction first element against the second element.

The present invention also provides a device, wherein the assembly formed by the first and second portions form a cam having a pivot axis.

The present invention also provides a device, wherein the assembly formed by the first and second portions has a cross-section that is substantially ellipsoidal.

The present invention also provides a brake system including an electronic computer, a brake control suitable for being actuated by a driver, detection means for detecting when said brake control is actuated, and detection means for detecting the speed of at least one wheel, said brake system also including at least one brake device of the present invention, applied to said wheel, the amplifier means being controlled by the electronic computer.

The present invention also provides a system, wherein the amplifier means of the device are activated when actuation of the brake control is detected that corresponds to a level of deceleration greater than a predetermined value.

The present invention also provides a system, wherein the amplifier means are actuated for a deceleration value to be reached that is greater than a predetermined value.

The present invention also provides a system, wherein the amplifier means are activated in the event that a necessity to decelerate said wheel is detected.

The present invention offers the advantage of making it possible to use small-size brake elements whose small size is compensated by the controlled wedging effect between the brake disk and the brake pad.

BRIEF DESCRIPTION OF THE DRAWINGS

The present invention will be better understood on reading the following description with reference to the accompanying drawings, in which.

MORE DETAILED DESCRIPTION

Figure 1:
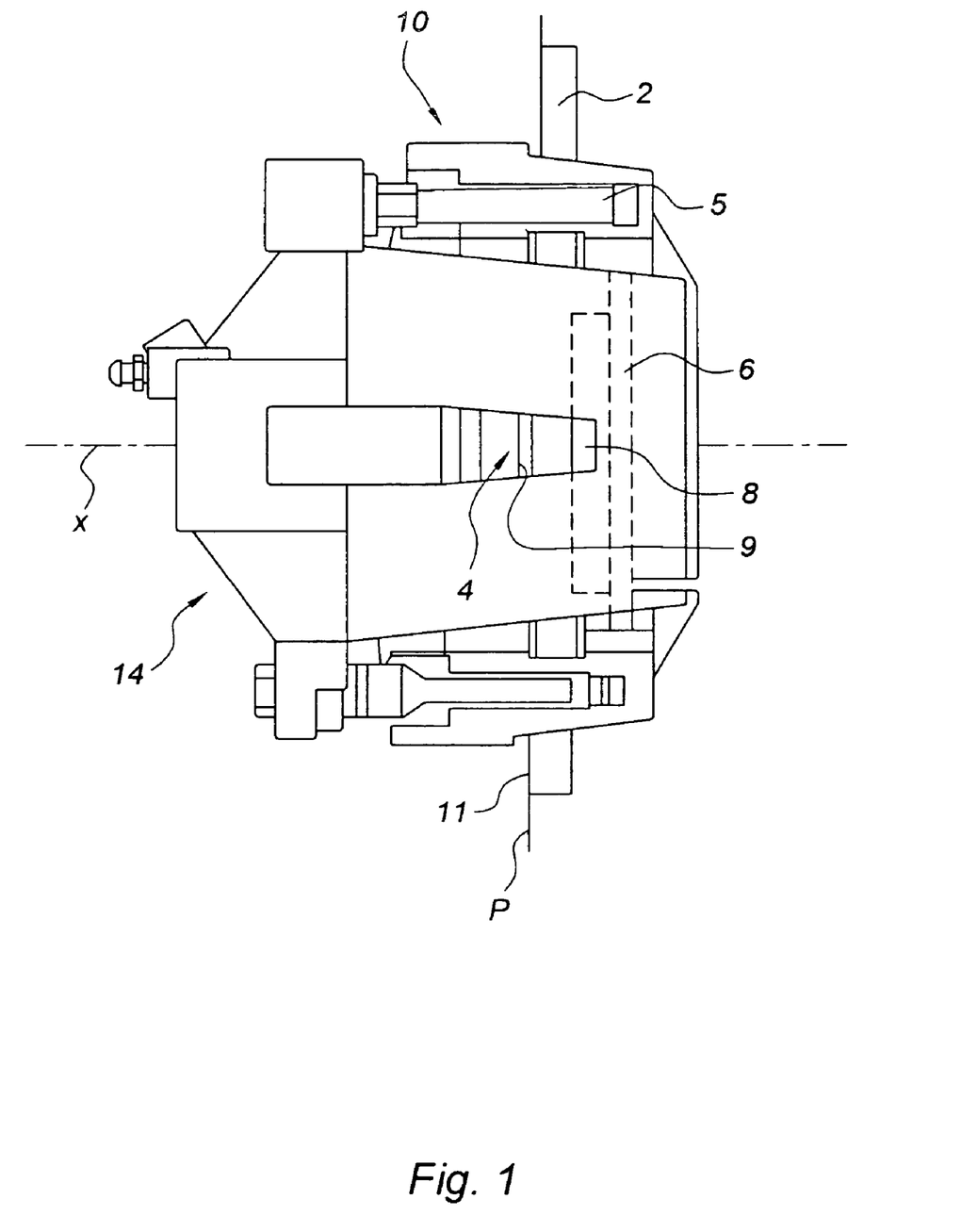
FIG. 1 is a plan view of an embodiment of a brake device of the present invention.

FIG. 1 shows a device of the present invention including a first element 4 or brake pad provided with a first face 9 for application against a second element 2 or brake disk that is constrained to rotate with a wheel (not shown) of a motor vehicle, which wheel can be rotated in a direction A or in a direction B about an axis Z. The pad is provided with a second face opposite from the first face, and typically but non-limitingly, the two faces are mutually parallel.

The second face is carried by a rigid support 6, e.g. made of sheet steel, and the application first face 9 is carried by a friction element 8 having a coefficient of friction $\mu$ or by a lining fixed to the support 6 by adhesive bonding and suitable for coming into contact with one face 11 of the brake disk 2 when the brakes are applied, thereby slowing down the speed of rotation of said brake disk. That face 9 of the lining 8 which is suitable for coming into contact with the face 11 of the disk is contained in a plane P.

The pad is mounted to slide along an axis X perpendicular to the plane P in a yoke 10 secured to a hub carrier of the vehicle.

Similarly, it is possible to imagine providing a pad that is mounted to slide in a brake caliper.

Advantageously, the device also includes two brake pads on either side of the brake disk in two planes that are substantially parallel, each pad being suitable for being pressed against an opposite face of the brake disk when the brakes are applied.

The brake device of FIG. 1 also includes a "floating" caliper 14 mounted to move relative to the yoke 10 and mounted to slide about the yoke via columns 5.

Naturally, the brake device of the present invention is not limited to a device including a caliper that is mounted to slide relative to a yoke, but rather it applies to any brake device making it possible to press at least one brake pad against a disk brake.

Figure 2:
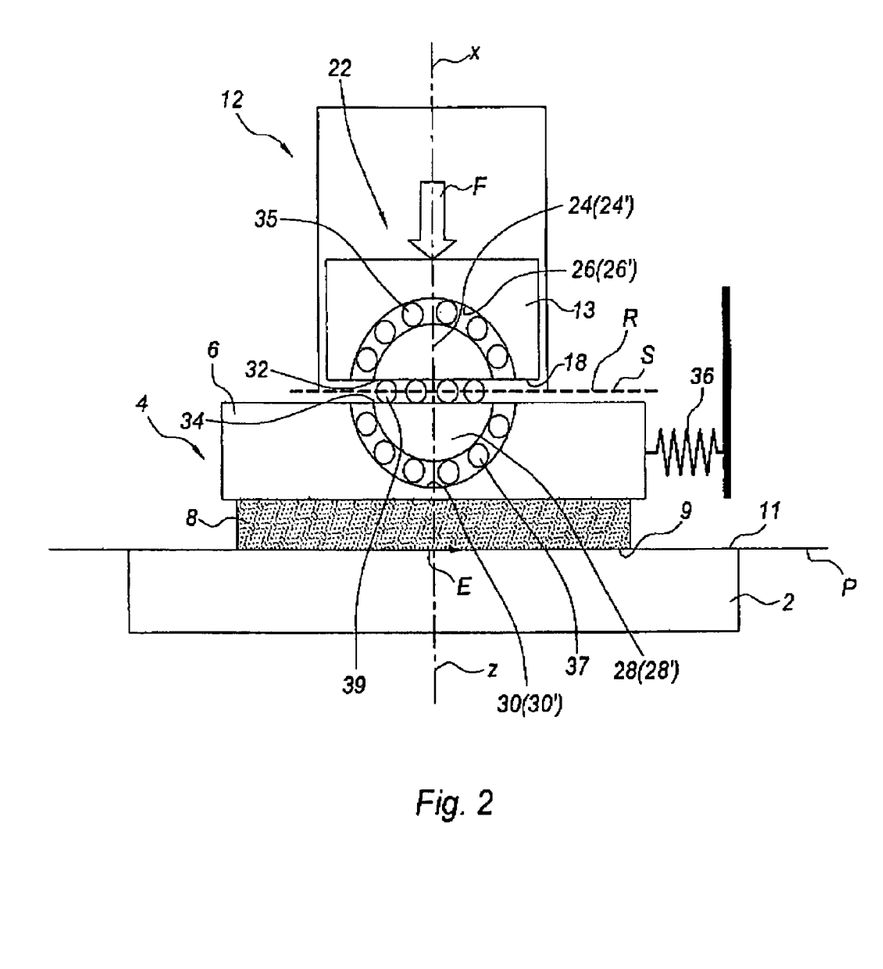
FIG. 2 is a diagrammatic view in longitudinal section through a first variant of a device of the present invention in a first operating mode.
Figure 3:
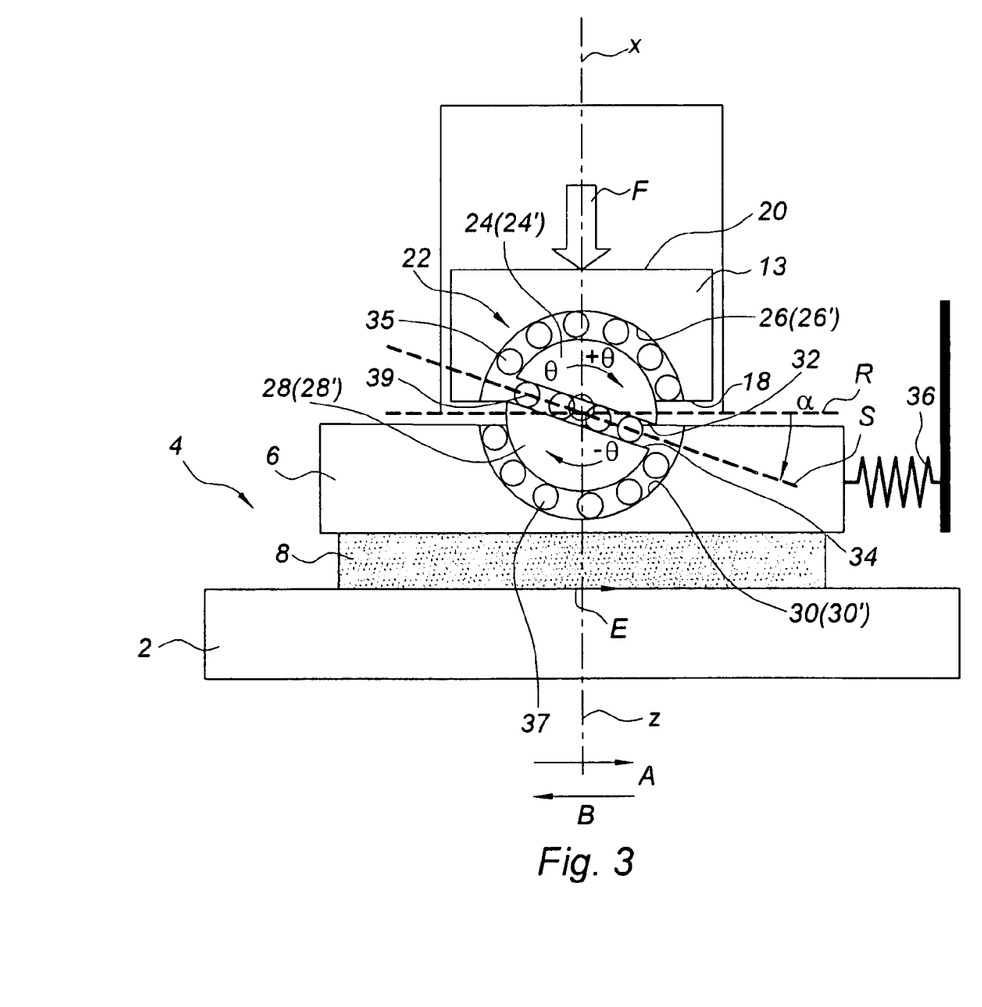
FIG. 3 is a diagrammatic view in longitudinal section through a first variant of a device of the present invention in a second operating mode.

FIGS. 2 and 3 show that the device of the present invention also includes a third element 12 for applying a braking force against the pad so as to press the brake pad against the brake disk.

The third means 12 for applying a braking force include a part referred to as a piston 13 that transmits the braking force and generator GN for generating a braking force. The brake piston 13 is mounted to slide in the caliper 14 that is mounted to slide along axis X by means of the columns 5.

The piston 13 is substantially cylindrical and bears via a first longitudinal end 18 along the axis X against the rigid support 6 in a plane R. In FIG. 2, the plane R is parallel to the plane P. In FIG. 3, the piston bears against the rigid support 6 in a plane S forming an angle α with the plane R and along an axis Y perpendicular to the section plane of FIGS. 2 and 3;

The piston 13 is subjected via a second longitudinal end 20 to a braking force EF exerted by the generator GN making it possible for the piston 13 to press the pad 4 against the brake disk 2.

For example, the generator GN for generating the braking force is a hydraulic pump and is controlled by an electronic computer, or it is a master cylinder actuated by a brake pedal 70 moved by the driver of the motor vehicle, sending a hydraulic fluid under pressure into the brake device, or else it is an assembly comprising a rotary first electric motor having a nut and screw device making it possible for the piston to be moved axially along the axis X towards the brake disk when the electric motor operates.

The piston 13 bears against the first friction element 4 via amplifier means 22 having a first portion 24 secured to the piston 13 and a second portion 28 secured to the rigid support 6, the first portion bearing against the second portion in the plane S, said plane S being mounted to pivot through an angle $\bar{\alpha}$ about the axis Y a first or a second direction +, −, e.g by a second electric motor controlled by the electronic computer.

In the embodiment shown in FIGS. 2 and 3, the first portion 24 is in the shape of a half-cylinder or of a half-sphere 24' mounted to pivot about the axis Y in a corresponding semi-cylindrical cavity 26 or hemispherical cavity 26' provided in the piston 13 via the first end 18. A rolling bearing 35, e.g. a ball bearing, is advantageously interposed between the first portion 24 and the cavity 26 in the piston.

The second portion 28 is also in the shape of a half-cylinder (or of a half-sphere 28') mounted to pivot about the axis Y in a corresponding semi-cylindrical cavity 30 (or a corresponding hemispherical cavity 30') provided in an element (not shown) secured to the rigid support 6. A rolling bearing, e.g. a ball-bearing 37 is advantageously interposed between the second portion 28 and the cavity 30 in the piston.

The element 28 is secured to the first friction element 4 and advantageously disposed in a cavity provided in the rigid support 6 that supports the brake pad 8, thereby making it unnecessary to replace the amplifier means 22 when changing the brake pad 8.

Naturally, it is also possible to provide a cavity 26 in a separate element mounted on the face 18 of the piston.

However, it is also naturally possible to provide a pad equipped with a rigid support and in which the second portion 28 of the means 22 is directly mounted to rotate.

The first and second half-cylinders 24, 28 (or the first and second half-spheres 24', 28') have respective plane ends 32, 34 via which they are mounted to slide relative to each other in the tiltable plane S.

In the embodiment shown, a ball bearing or a roller bearing 39 is interposed between the plane ends 32, 34.

The plane ends 32, 34 are parallel to the plane R when the means 22 are not activated.

α advantageously lies in the range 0° to 5°, and preferably in the range 0° to 4°.

Naturally, it is possible, without going beyond the ambit of the present invention to implement any other means making it possible to facilitate movement of the half-cylinders 24, 28 (or of the half-spheres 24', 28') relative to each other, and pivoting of them in their respective cavities 26, 30 (or 26', 30'), e.g. by using self-lubricating materials for the means 22.

The present invention is also applicable to a brake device that can have a fixed caliper in which two pistons are mounted to slide on either side of the brake disk and which is suitable, when the brakes are applied, for pressing each of the pads against a respective one of the opposite faces of the reaction disk.

Below, consideration is given merely to a device having a single piston, but naturally the invention also relates to brake devices having two or more pistons.

The yoke in which the pad slides along the axis X has structural resilience symbolized in FIGS. 2 and 3 by a spring 36 of stiffness K1.

An explanation follows of how the brake device of the present invention operates.

In the operating mode shown in FIG. 2, the brake device operates as a conventional-type device. The plane S with which the plane ends 32, 34 are parallel, and the plane R coincide, and therefore the plane S is parallel to the plane Q of the brake disk.

When a braking force EF is delivered by the generator GM on the second end 20 of the piston 13, said piston slides along the axis X in the direction indicated by arrow F, and moves the brake pad in translation, so that it comes into contact with the surface of the brake disk driven in rotation about the axis Z in the direction A. Due to the brake disk moving in rotation, the pad is subjected to torque E in the direction A due to the yoke deforming elastically. In particular, the plane end 34 of the second half-sphere 28 slides (or rolls) relative to the plane end 32 of the first half-sphere.

The pad 6 in contact with the brake disk moves substantially laterally in a plane parallel to the plane of the brake disk 2 under the action of the torque E and by the yoke deforming elastically.

In the operating mode shown in FIG. 3, the half-cylinders (or the half-spheres) have pivoted about the axis Y in the direction +θ, and the plane S then forms an angle α relative to the plane R about the axis Y. The brake disk is rotating in the direction A.

When a brake force EF delivered by the generator GN is exerted on the piston 13, said piston moves along the axis X and drives the pad 6. The pad 6 is pressed against the brake disk and is driven in the direction A by the torque E. The pad 4 then moves laterally in a plane parallel to the plane of the disk in the direction A, and in particular the plane end 34 of the second half-cylinder 30 (or of the second half-sphere) slides relative to the plane end 32 of the first half-cylinder (or of the first half-sphere). Due to the inclination of the plane S relative to the plane of the brake disk, the pad 4 finds itself "wedged" between the disk and the piston, and the braking force EF is then amplified proportionally to the angle α.

The brake device of the present invention advantageously co-operates with measurement means for measuring the various parameters, such as, for example, the deformation DF of the yoke and/or the speed of the wheel and/or the displacement of a brake pedal causing a braking force to be applied to the piston.

Measuring the deformation DF of the yoke makes it possible to quantify the wedging effect and thus to regulate it by modifying the angle α.

Measuring the displacement of the brake pedal and in particular the speed of displacement of said brake pedal, or measuring the force applied to the brake pedal makes it possible to determine whether the braking desired by the driver corresponds to braking of high magnitude, i.e. to emergency braking, and thus to amplify the braking force delivered by the generator, e.g. by the driver, via a master cylinder or via a hydraulic pump when an electrohydraulic brake system is used, by causing the angle α to vary.

Since about 80% of braking actions correspond to deceleration of less than 0.3 G (the threshold below which power-assisted braking is not necessary), it is possible, advantageously, to consider activating the means 22 for amplifying the braking force only for a desired deceleration greater than 0.3 G, for example.

The braking device of the present invention also makes it possible to modify the ratio of amplification of the braking force exerted on the piston during a regulation stage performed by a system for dynamically controlling the path of the vehicle, e.g. in the event that a wheel blocks or that road-holding is lost.

Figure 4:
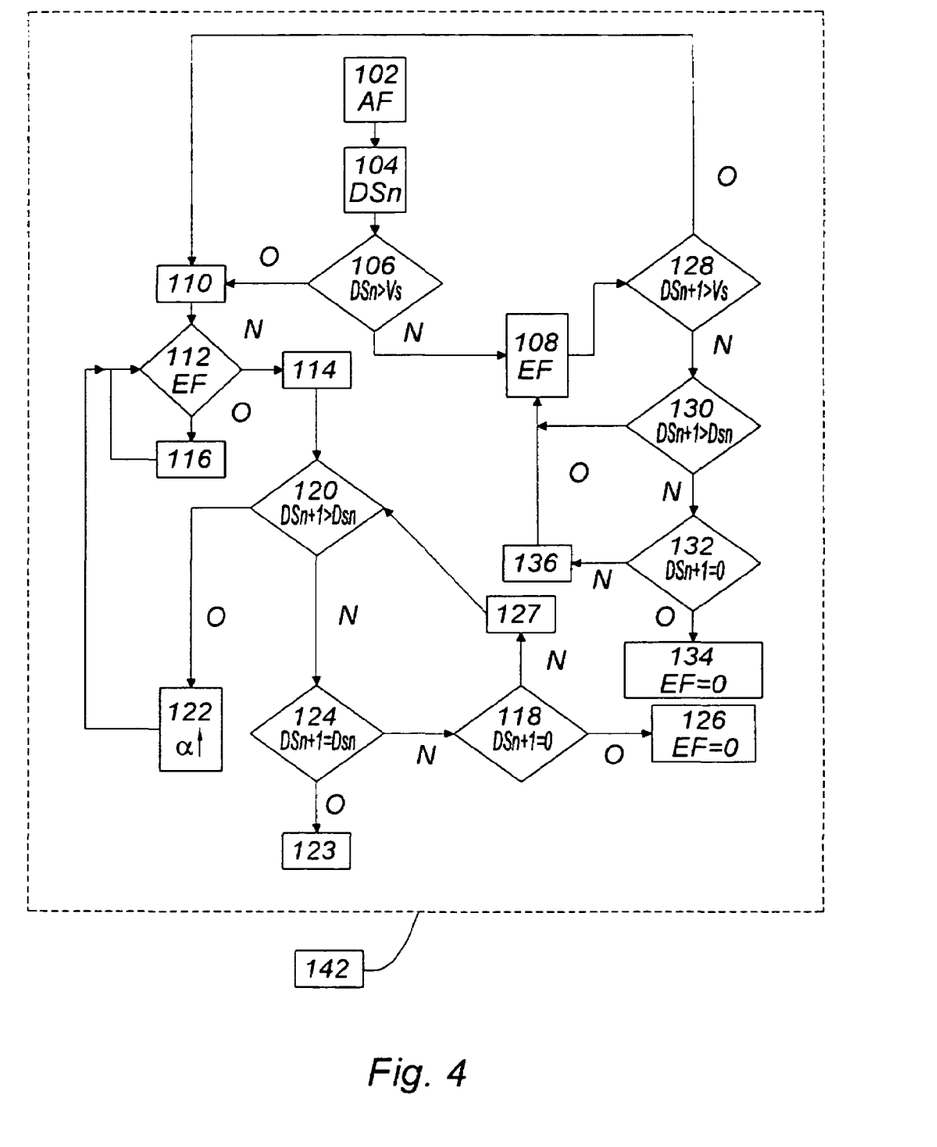
FIG. 4 is a flow chart showing a first example of braking, implementing a brake device of the present invention.

FIG. 4 shows a first example of a flow chart of the various steps of a braking action implementing a brake system of the present invention. For example, the brake system is an electro-hydraulic or all-electrical brake system. When the system is an electro-hydraulic brake system, a master cylinder simulates, under normal operating conditions, how the brake circuit reacts to the brake pedal, and the braking force applied to the piston is exerted by brake liquid sent by an electro-hydraulic pump controlled by an electronic computer in response to the displacement of the brake pedal being detected.

When the system is an electrical brake system, an application electric motor (not shown) applies a braking force to the piston, e.g. via a nut and screw assembly, the application motor being actuated by an electronic computer in response to the displacement of the brake pedal being detected.

In the description below, when the term "braking force EF" is used without any further specifications being given, it is a force exerted by a hydraulic or pneumatic fluid, or by an electric motor.

In step 102, a braking action AF is detected, e.g. by a stroke sensor 40 disposed at the brake pedal. In step 104, the information is sent to an electronic computer 42 which determines the value DS of the deceleration desired by the driver.

In step 106, the computer compares the deceleration value DSn with a threshold value Vs.

It is possible to imagine providing a determined and non-modifiable value Vs or a value Vs modified by the electronic computer as a function of the traffic conditions.

In the description below, the reference DSn designates the first value of DS measured, and the reference DSn+1 designates the next value of DS.

If DSn is less than Vs, in step 108 the computer generates an order to the force generator GN to exert a braking force EF on the piston.

In step 128, the computer verifies the variation of DS, by measuring DSn+1.

If DSn+1 is less than Vs, the method proceeds to step 130.

In step 130, the computer compares DSn+1 with DSn.

If DSn+1 is less than DSn, in step 132 the computer verifies whether DSn+1 is equal to zero.

If DSn+1 is equal to zero, in step 134 the computer generates the order to the pressure generator GN to cease exerting the braking force EF.

If DSn+1 is not equal to zero, in step 136 the computer generates the order to modify EF in order to adapt the braking to the desired deceleration level DSn+1, and then the method returns to step 108.

If DSn+1 is greater than DSn, the method proceeds to 108.

If DSn+1 is greater than Vs, the method proceeds to 110.

The description below involves DSn but also applies to DSn+1 coming from step 128.

If DSn is greater than Vs, the method proceeds to step 110.

In step 110, the computer generates an order to the force generator GN to exert a braking force EF on the piston and to the means 22 to cause the plane S to pivot about the axis Y through an angle α determined by means of the models entered in the memory of the computer 42.

In step 112, means for detecting the stability of the wheel, e.g. a sensor 46 for sensing the deformation of the yoke and/or a sensor 48 for sensing the speed of the wheel 48, transmit their measurements to the computer 42 which determines whether there is a risk of the wheels blocking, the sensors 46 and 48 are advantageously associated so that their measurements can be correlated.

If no risk of blocking is detected, in step 116, the computer instructs the electric motor to reduce the angle α, and if the wedging angle α is not sufficient, the computer instructs the generator GN to reduce the braking force on the piston 13. This is performed in a plurality of steps in which the risk of the wheels blocking is verified and in which the angle α is modified.

If there is no risk of blocking, the braking is continued in step 114.

In step 120, the computer determines a new value for DS, DSn+1 with the detection means disposed at the brake pedal, and compares DSn+1 with DSn.

If DSn+1 is greater than DSn, in step 122 the computer instructs the means 22 to increase the angle α, and the risk of the wheel blocking is verified simultaneously in step 112.

If DSn+1 is less than DSn, in step 124 the computer verifies whether DSn+1 is equal to DSn.

If DSn+1 is equal to DSn, in step 123 the computer generates the order to the means 22 to maintain the angle α.

If DSn+1 is different from DSn, at 118 the computer verifies whether DSn+1 is zero.

If DSn+1 is zero, in step 126 the computer generates the order to the means 22 to reduce α to zero, and to the generator GN to reduce the braking force EF to zero.

If DSn+1 is not zero, in step 127 the computer generates the order to the means 22 to modify α, and then the method proceeds to step 120.

Figure 5:
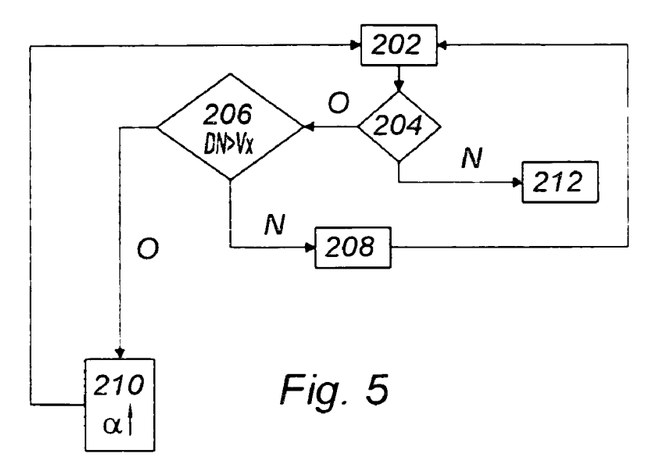
FIG. 5 is a flow chart showing a second example of braking, implementing a brake device of the present invention.

FIG. 5 shows the flow chart corresponding to the brake system operating without action on the brake pedal being detected, when the need to slow down at least one wheel, is detected, e.g. by means disposed at the wheels and/or on the body of the motor vehicle, for example when the wheel lacks grip or when an obstacle is detected requiring the vehicle to slow down in order to avoid impact between the vehicle and the obstacles.

The detected deceleration value is referred to as the "necessary deceleration value DN" that is necessary for correcting the path of the vehicle.

In step 202, various parameters are measured, e.g. the speed of rotation of the wheels, the path that the vehicle is to follow, as a function of the position of the steering wheel and the distances at which the obstacles around the vehicle are situated, and said parameters are transmitted to the computer.

In step 204, the computer determines whether one or more wheels should be slowed down.

If no wheel needs to be slowed down, the braking stage ends at 212.

In step 206, the computer determines the necessary deceleration level DN.

If DN is less than a predetermined deceleration value Vx, in step 208 the computer generates an order to a generator GN to apply a braking force to the piston, and then the method proceeds to step 202 in order verify whether the situation is normal again.

If DN is greater than Vx, in step 210 the computer generates an order to the generator to apply a braking force to the piston 13 and to the means 22 to increase the angle α by causing the plane S to pivot, and more precisely by causing the first and second pivotally mounted portions 24, 28 to pivot in the cavities 26, 30.

Then the method returns to the step 202 for the purpose of monitoring the effect of the braking actions, and, if necessary, to cause one or more wheels to slow down again.

Figure 6:
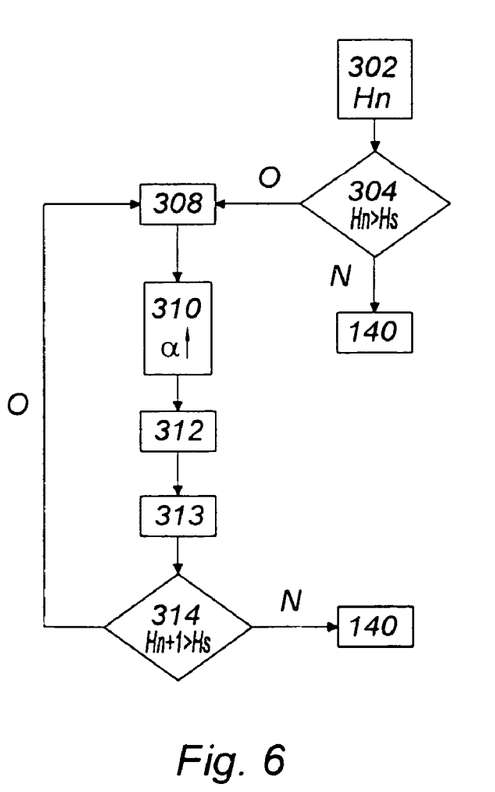
FIG. 6 is a flow chart showing a third example of braking, implementing a brake device of the present invention.

FIG. 6 shows a flow chart of how a conventional hydraulic brake system operates, in which system the pedal being depressed causes brake liquid to be sent under pressure from the master cylinder to the brake devices placed at the wheels. The situation described corresponds to an emergency braking situation.

In step 302, the speed of displacement of the brake pedal and/or the force applied to the brake pedal H is measured Hn.

In step 304, the computer compares the value(s) H with predetermined values Hs.

If Hn is less than Hs, the braking action is normal, and the flow chart 140 then applies (flow chart shown in FIG. 4).

If Hn is greater than Hs, the braking action is then treated as being emergency braking, and the computer generates the order to close solenoid valves interrupting communication between the master cylinder and the brake devices, which corresponds to the step 308.

In step 310, the computer generates the order to the means 22 to increase the angle α.

In step 312, the parameters making it possible to evaluate the stability of the wheel equipped with the brake and therefore the stability of the motor vehicle, e.g. the parameters of wheel rotation speed, and of yoke deformation, are measured and the risk of the wheels blocking is verified in step 313, the step being the equivalent of the step 112 in the flow chart of FIG. 4.

In step 314, the computer compares a new value of H, Hn+1 and compares Hn+1 with Hn.

If Hn+1 is less than Hs, it is the step 140 that applies (see FIG. 4).

Otherwise, it is the step 308 that applies.

However, it is also possible to make provision for there to be no solenoid values separating the master cylinder from the braking devices and for the computer also to manage the effects of the braking actions taken by the driver on the braking of the vehicle.

Naturally, the operating flow charts shown in FIGS. 4, 5 and 6 are given merely by way of example, and are in no way limiting. In addition, they are suitable for being applied simultaneously, in which case they are modified to make it possible for good co-operation to be established between them without the various actions interfering with one another.

Naturally, the examples of operating flow charts are not limiting and the person skilled in the art is capable of modifying them and adapting them to solve problems in which the brake device of the present invention can contribute to providing a solution.

Figure 7:
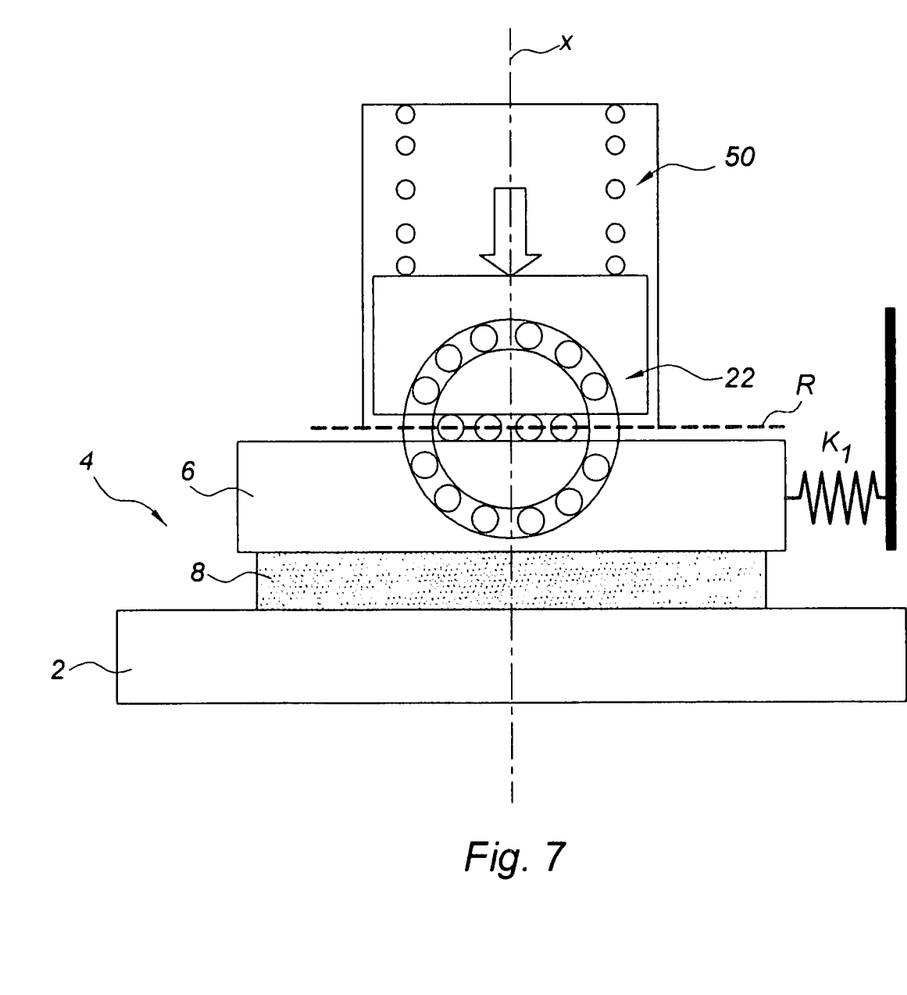
FIG. 7 is a diagrammatic view in longitudinal section through a second variant embodiment of a device of the present invention.

FIG. 7 shows a second embodiment for which the amplifier means 22 also make it possible to improve the operating safety of an electrical brake device.

The device has a braking force generator GN formed, for example, by a first motor applying a braking force to the piston 13 during a braking stage in order to press at least one brake pad against the brake disk.

The amplifier means 22 are interposed between the piston and the pad.

The brake device also has additional application means 50 for pressing the brake pad against the disk in the event that the generator GN or M1 fails.

For example, the application means comprise resilient means, e.g. a spring disposed between the piston and a fixed element upstream from the piston along the axis X.

In the event that the first motor fails, the spring 50 is released and it presses at least one brake pad against the brake disk. The amplifier means 22, and in particular a second motor (not shown) pivots the half-cylinders (or half-spheres) so as to amplify the braking force applied by the spring.

It is also possible to imagine making provision for the additional application means 50 to apply a small but continuous braking force, enabling the disk to be "wiped" by the pad. Naturally, this is possible only if the residual torque does not prevent the motor vehicle from operating properly.

It is also possible to make provision to omit the generator for generating a braking force proportional to the desired braking, e.g. an electric motor or a hydraulic fluid under pressure, to have the disk "wiped" continuously by at least one pad, and to regulate the level of deceleration by using the means 22 only.

Figure 8:
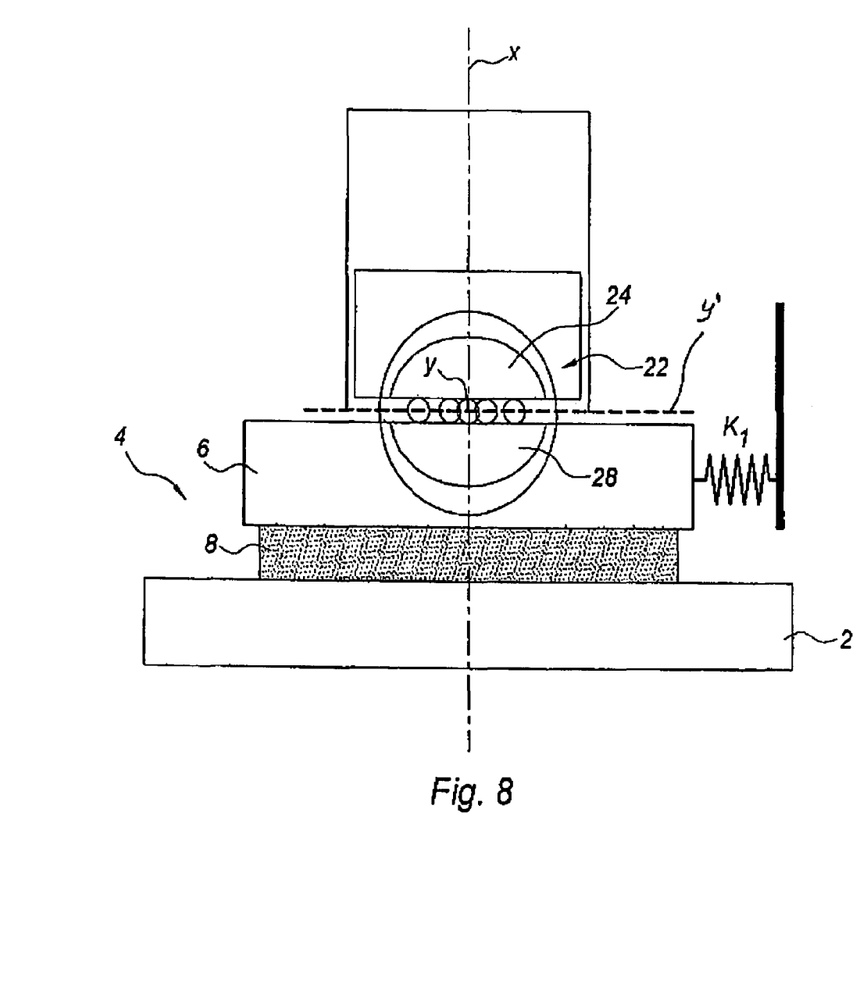
FIG. 8 is a diagrammatic view in longitudinal section through a third variant embodiment of a device of the present invention.
Figure 9:
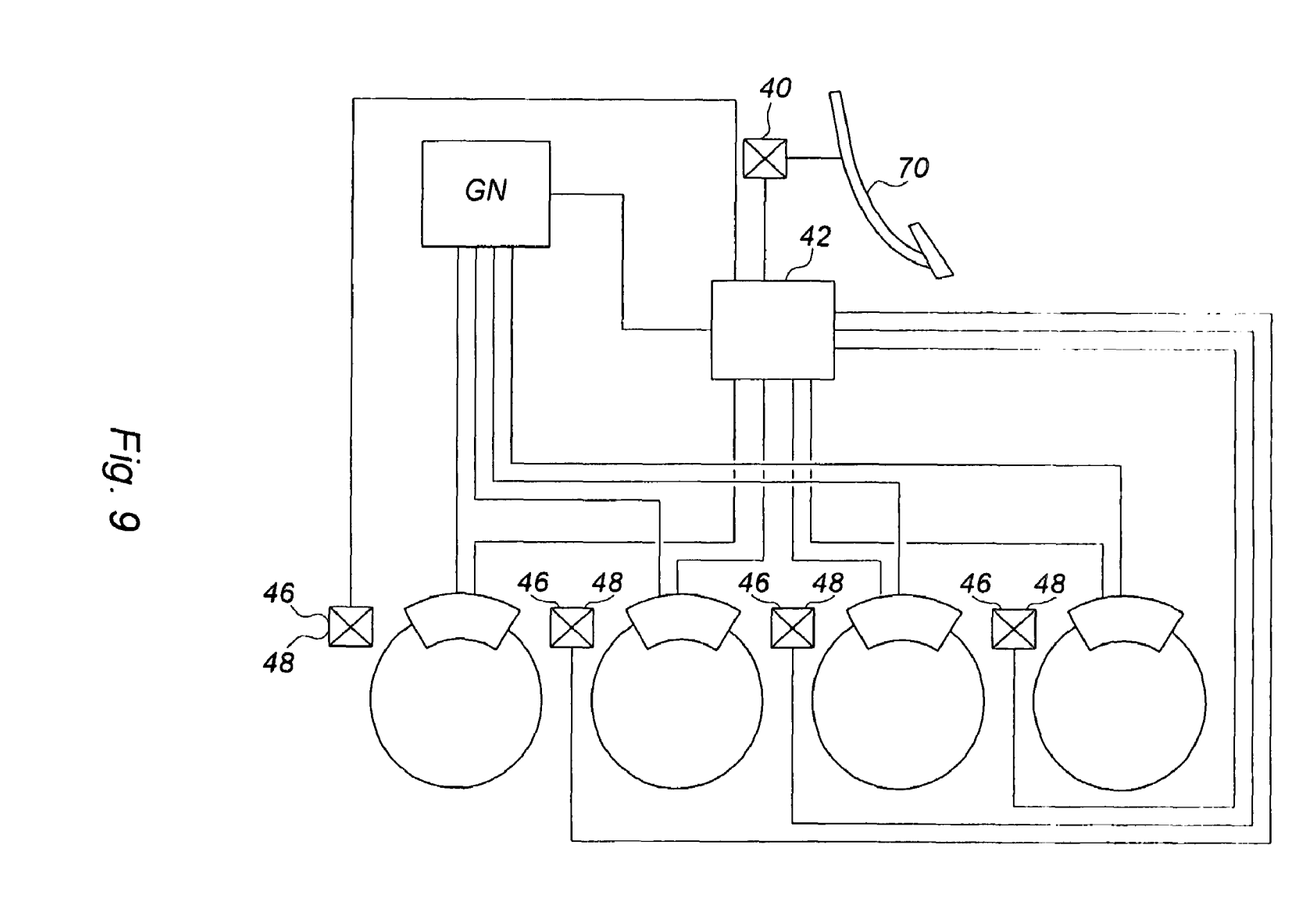
FIG. 9 is a diagram of a brake system of the present invention.

FIG. 8 shows a detail of a third embodiment of the brake device of the present invention including means 22 forming the generator GN for generating a braking force EF and the amplifier for amplifying said braking force.

The first and second portions 24, 28 are of shapes making it possible, as they pivot, to bring the pad 4 towards the brake disk 2.

For example, the first and second half-cylinders (or the first and second half-spheres) form a cam of axis Y' different from the axis Y and disposed in a recess of substantially circular section, the recess being formed by a first semi-cylindrical (or hemispherical) cavity carried by an element that is fixed relative to the brake pad and by a second semi-cylindrical (or hemispherical) cavity provided directly in the rigid support 6 of the pad or in an element secured to said pad, but nevertheless capable of being disunited from the pad while the brake pad is being changed.

It is also possible for the assembly formed by the first and the second portions 24, 28 to be of substantially ellipsoid shape about the axis Y or about the axis Y' so as also form a cam as shown in FIG. 8.

Thus, for example, when a detection of a braking action is transmitted to the computer, said computer gives the order to the motor 22 to pivot the cam, thereby moving the pad away from the fixed element, and thus pressing the pad 4 against the brake disk 2, and also amplifying the brake force exerted by the cam against the pad by a wedging effect.

This particular embodiment offers the advantage of being particularly compact.

It is also possible to imagine a brake device of the present invention that can be used as a parking brake and including means for applying a braking force continuously when the vehicle is stationary, in compliance with the legislation governing parking brakes, e.g. a Ball-In-Ramp (BIR) device which, when traction is applied to cables connected to the BIR device, e.g. by means of a parking brake lever disposed inside the vehicle, applies a braking force on the piston so as to press the pad against the brake disk. The system controlling the means 22 includes means for detecting the gradient on which the motor vehicle is to be held stationary.

When the parking brake is activated, the pads are pressed against the brake disk, and the detection means detect the direction of the slope. On substantially horizontal ground, the computer generates an order to the motor M2, if necessary, to amplify the braking force exerted by the parking brake means.

On sloping ground, the computer generates the order to the motor to tilt the plane S in the same direction as the slope, thereby causing the braking force to be amplified because the pad is subjected to torque from the brake disk in the same direction as the slope by means of the wedging effect appearing.

However, it is necessary to take account of the fact that the two half-cylinders (or the two half-spheres) roll slightly relative to each other when the means 22 are actuated, and thus the stop position is modified by the value of the rolling in the means 22.

The present invention offers the advantage of making it possible to use braking force generators that are lower in power, since the braking force is amplified by the means 22, which is particularly advantageous in electrical brake devices.

The motor used to pivot the half-spheres or half-cylinders must enable them to be pivoted rapidly so as to adapt the angle α to the braking situation and also so as to enable the brake pad to be disengaged when the amplification delivered by the means 22 is no longer desired.

Naturally, provision is made for all of the braking parameter measurements to be taken at predetermined and advantageously regular time intervals making it possible for the flow charts to be executed substantially continuously, if necessary.

A brake device is indeed obtained that includes means for amplifying the braking force delivered by a generator, the amplification being controlled and continuously variable.

The present invention is particularly applicable to the automobile industry.

The present invention is applicable particularly to the brake industry for motor vehicle brakes, and in particular to the brake industry for private motor vehicle brakes.

What is claimed is:

1. A brake device for a motor vehicle having a first friction element including a lining with a first face that is pressed against a first face of a second element that is secured to a wheel of the motor vehicle in order to slow down the vehicle and an application third element having a piston with a first end through which a braking force is applied to a second face on a rigid support of the first friction element to effect a brake application, said brake device being characterized by amplifer means having a first part that is connected to the first end of said piston and a second part that is connected to the second face of the rigid support, said first part of said amplifer means having a first plane face that is parallel to and in mutual abutment with a second plane face on said second part through a bearing surface, such that in response to the braking force being applied to said piston, the first part and the second part of the amplifier means pivot about a tiltable plane that is initially substantially parallel with the first face of the second element to modify the application of the braking force through the rigid support in effecting a brake application.

2. The brake device according to claim 1 wherein said the first part has a shape of a first half-cylinder disposed in a first semi-cylindrical cavity located in the piston and wherein the second part has a shape of a second half-cylinder located in second semi-cylindrical cavity in the rigid support.

3. The brake device according to claim 1 wherein said the first part has a shape of a first half-sphere disposed in a first hemispherical cavity located in the piston and wherein the second part has a shape of a second half-sphere located in second hemispherical cavity in the rigid support.

4. The brake device as recited in claim 2 further including first means for reducing friction between the first part and the piston and second part and the rigid support.

5. The brake device as recited in claim 4 further including second means for reducing friction between the first plane surface on the first part and second plane surface on the second part.

6. The brake device as recited in claim 5 wherein said first and second means are ball bearings.

7. The brake device as recited in claim 1 wherein initial pivoting of the first part and the second part of said amplifier means is achieved through the activation of an electric motor.

8. The brake device as recited in claim 1 further including a park brake mechanism connected to the amplifier means such that the tiltable plane is in a same plane as a gradiant on which the motor vehicle is parked.

9. The brake device as recited in claim 7 further including an electronic computer, a brake control actiated by an operator, first detection means for detecting of said brake control and second detection means for detecting the speed of the wheel to control the activation of said amplifier mean.

10. The brake device as recited in claim 9 wherein the amplifier means is activated when a level of declaration is greater than a predetermined value.

11. The brake device as recited in claim 9 wherein the amplifier means is activated to decrease the decelartion of the speed of the wheel.

* * * * *